Figure 1:
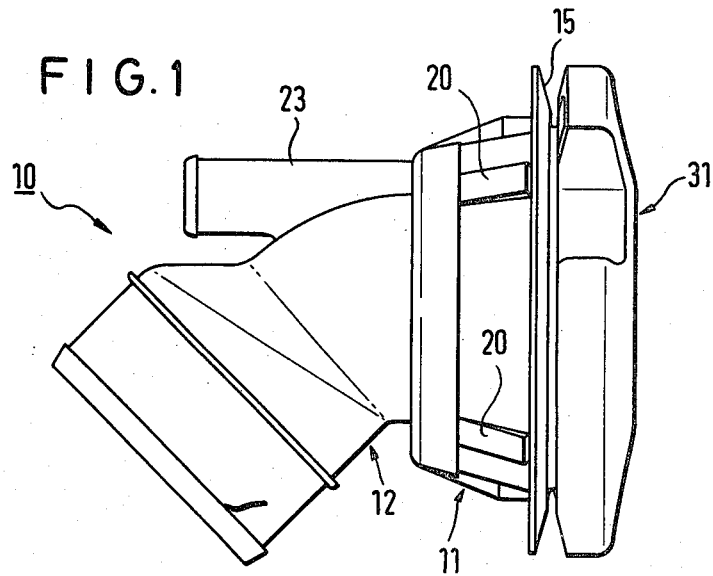

United States Patent [19]

Heinke

[11] 4,341,322

[45] Jul. 27, 1982

[54] FILLING CONNECTION FOR VEHICLES DRIVEN BY INTERNAL COMBUSTION ENGINES

[75] Inventor: Horst Heinke, Hamburg, Fed. Rep. of Germany

[73] Assignee: ITW Ateco GmbH, Norderstedt, Fed. Rep. of Germany

[21] Appl. No.: 156,842

[22] Filed: Jun. 5, 1980

[30] Foreign Application Priority Data

Jun. 2, 1979 [DE] Fed. Rep. of Germany ....... 2922611

[51] Int. Cl.³ ............................................. B65D 55/14
[52] U.S. Cl. .................................... 220/210; 70/172; 70/168; 220/DIG. 33
[58] Field of Search .................................. 70/167–169, 70/171–173; 141/98, 392; 220/210, 203, 303, DIG. 33, 86 R; 280/5 A

[56] References Cited

U.S. PATENT DOCUMENTS

| 4,000,633 | 1/1977 | Evans | 220/210 X |
| 4,160,511 | 7/1979 | Hukuta | 220/210 |
| 4,164,302 | 8/1979 | Gerdes | 70/172 X |
| 4,231,240 | 11/1980 | Fujita et al. | 220/210 X |

Primary Examiner—Frederick R. Schmidt
Attorney, Agent, or Firm—Jerold M. Forsberg; Thomas W. Buckman; Jack R. Halvorsen

[57] ABSTRACT

A filling connection for vehicles driven by internal combustion engines, which is fastened in an opening of the car body and has one section disposed on the inside of the car body adapted to be connected to a line leading to the fuel tank, while a section disposed on the outside is provided with an inner or outer thread onto which a lid may be screwed, and an axially effective sealing is arranged between the lid and the section disposed on the outside.

9 Claims, 7 Drawing Figures

U.S. Patent  Jul. 27, 1982  Sheet 1 of 3  4,341,322

FILLING CONNECTION FOR VEHICLES DRIVEN BY INTERNAL COMBUSTION ENGINES

BACKGROUND OF THE INVENTION

Filling connections for fuel tanks are either formed in one piece with the filling tube or as separate members. Because of the difficulties arising in connection with the assembly of one-piece filling tubes the separate filling connections are usually preferred. The separate filling connection, if consisting of metal, is connected to the filling tube by welding or soldering or is connected to the filling tube via an elastic sleeve and with the aid of pipe clips or the like, especially when it is made of synthetic material. A one-piece filling connection has become known which is formed of synthetic material and is adapted to be fastened in the body opening by being snap positioned therein (German disclosure letter 2 553 881).

The "tank cap" which closes the filling connection on the outside is either designed as a bayonet type closure (which is the most widely spread type of embodiment) or is provided with an inner or outer thread and screwed onto the connection. In the case of the above mentioned known filling connection there is provided an outer sawtooth thread onto which the lid which is likewise formed of synthetic material may be screwed by means of a corresponding inner thread fitting into it. At annular seal is arranged on the inside of the thread of the lid and cooperates with the end face of the outer section of the connection. Another seal is arranged inside the thread of the connection and cooperates with the exterior lid inner surface.

In the case of the known filling connection there is no closure means provided for the lid. It is usually arranged inside the lid and with a bayonet closure is effective to cause an idle movement of the lid. In connection with a screw thread formation a predetermined axial position of the lid is necessary so that the bar of the closing device may be brought into the interlocking position. In both cases the adaptation of the axially effective sealing between the lid and a corresponding seating surface of the connection is predetermined right from the beginning and cannot be changed any more, so that in case of wear or fatigue a reduction of the sealing effect will occur with the result that fuel may escape.

The invention is based upon the problem of providing a filling connection for vehicles driven by internal combustion engines in which the lid may be interlocked in any position that may be desired independently of its axial position.

According to the invention this problem is solved in that the lid is provided with an axial hollow projection extending into the filling connection with a bar movably supported in said projection which is adapted to be adjusted transversely to the axis of the projection between an retracted and an extended position by means of a closure device arranged inside the projection, and in that there are arranged on the inside of the filling connection spaced from the opening thereof several circumferentially spaced elevations and/or deepenings with which the bar cooperates in the extended position thereof.

The filling connection which is preferably formed of synthetic material is provided on the inside thereof with circumferentially spaced elevations and/or deepenings spaced through a distance from the outer opening, which serve as arresting abutments for the bar of the closure device. If the lid is screwed onto the filling connection, the elevations or deepenings which have a length exceeding the width of the bar, make possible an interlocking engagement of the lid independently of the contact pressure force with which it is effective against the sealing. It is thus possible to screw the lid onto the connection with little contact pressure and with as great a contact pressure as may be desired and obtain an interlocking engagement in any of these positions and all the intermediate positions.

The corresponding abutments on the inside of the connection may have any shape that may be desired, all that has to be made sure is that they do not obstruct the introduction of a filling nozzle. Provision is made in one embodiment of the invention for the inside of the connection to be provided with a circumferentially extending toothing. The toothing in this case is preferably arranged at a position a short distance before the point where the filling connection is bent off in a direction towards the filling tube and becomes narrower in its cross sectional area. The invention does not make it a condition that the bar and toothing cooperate with each other without play. Provision is, however, made in one embodiment of the invention for the end of the bar to be shaped corresponding to the shape of the gap between adjacent teeth. In the interlocked position the bar is thus securely seated on the connection both axially and in the direction of rotation.

The closure device and the bar may again be designed in any suitable manner. Provision is made in one embodiment of the invention for this purpose for two diametrically arranged bar elements to be radially movably guided within the projection and through a radial opening provided in the projection. The bar elements are advantageously provided with an arcuate slot disposed in a radial plane, for the journal of the closure device which is movable on a circular path. Inside the projection there are provided suitable guide means for the bar elements. This guiding arrangement according to another embodiment of the invention may consist in that the wall of the projection pointing into the interior of the connection is provided with ribs on the inside thereof for guiding the bar elements.

The projection arranged axially at the lid is advantageously formed cylindrically or conically, with the latter shape being preferred. The inside of the filling connection is formed in correspondence with the manner in which the outside of the projection extends, so that the elevations or deepenings and toothings, respectively, are arranged on a circular or conical ring area. The projection is closed towards the filling pipe by means of a wall which, according to another embodiment of the invention, comprises the axially effective sealing cooperating with a radial seating area of the connection. In this manner, the sealing is displaced inside a considerable distance thereby obtaining a particularly good sealing effect. The position of the sealing, besides, prevents fuel from getting into contact with the closure device.

If the lid is formed of synthetic material, it is advantageous to form the projection separately as a cup-shaped member which is adapted to be connected to the inside of the lid by means of a suitable snap type connection.

For the retention of the closure device inside the projection provision is made in another embodiment of the invention for a cylindrical axial sleeve to be arranged inside the projection for the accommodation of a closure cylinder, said closure cylinder being provided with an elastic arresting projection getting snap positioned in a recess of the sleeve. The axial sleeve is preferably shaped in one piece with the lid.

One example of embodiment of the invention will be described in the following in more detail with the aid of drawings.

Figure 2:
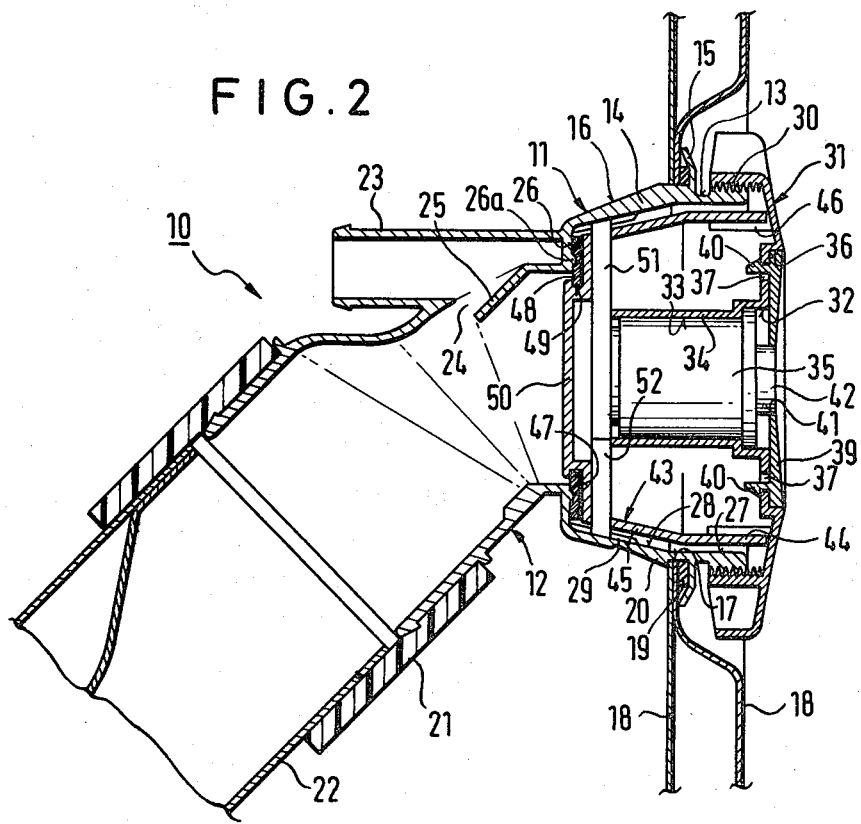
Figure 3:
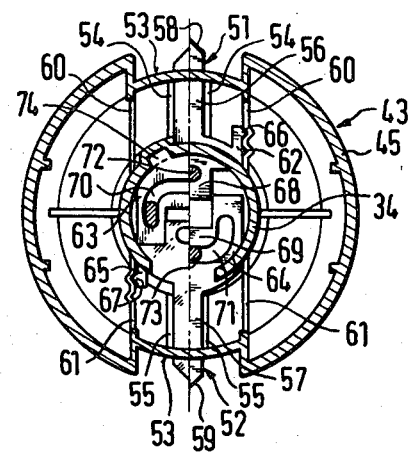
Figure 4:
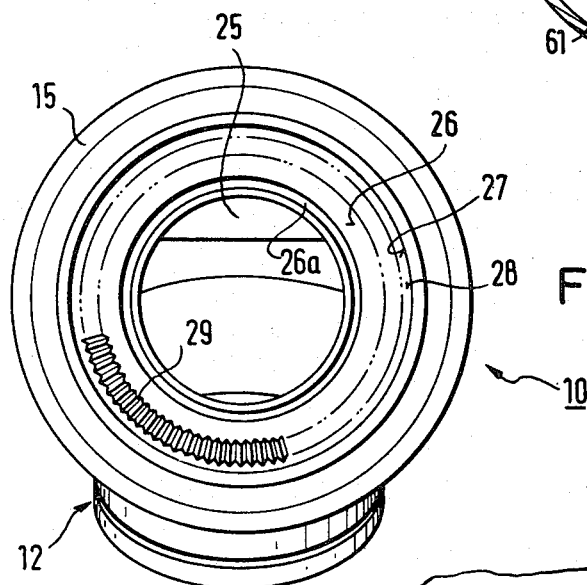
Figure 5:
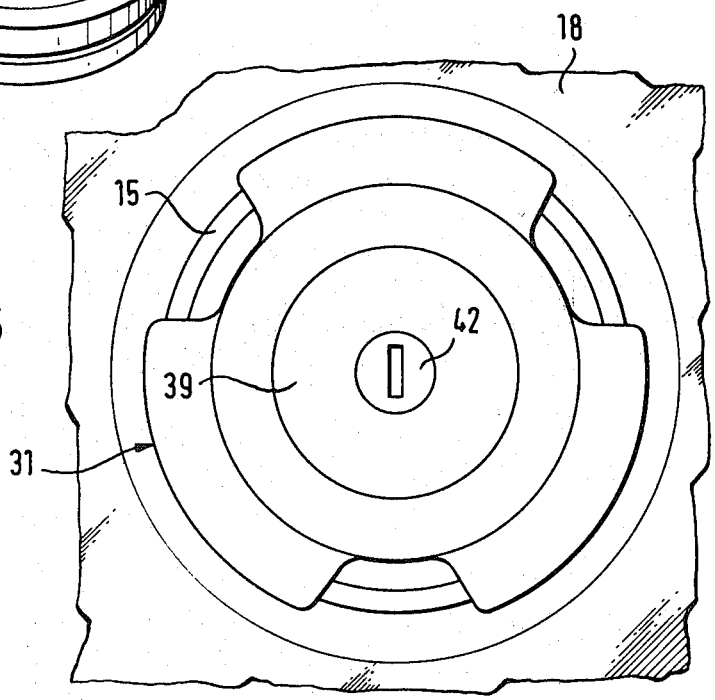
Figure 6:
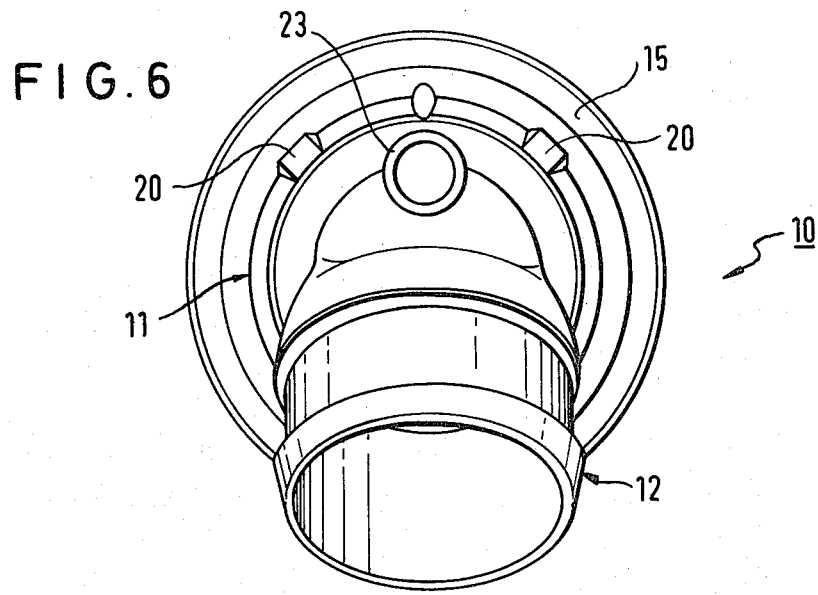
Figure 7:
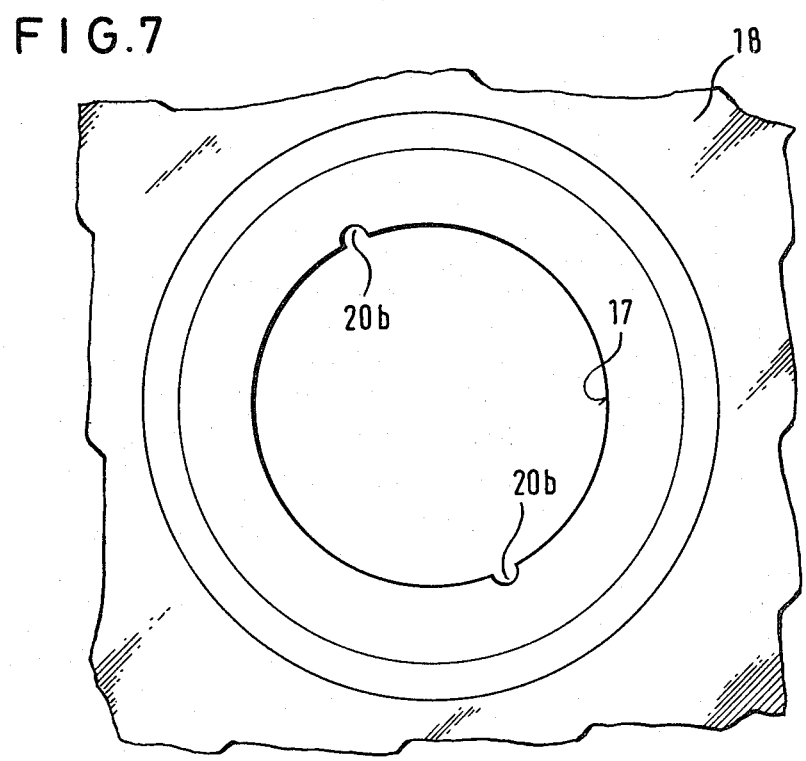

FIG. 1 shows a side view of the filling connection according to the invention including the lid, FIG. 2 shows a sectional view of the filling connection and lid according to FIG. 1 in the assembled condition, FIG. 3 shows a sectional view of the lid of the filling connection according to FIGS. 1 and 2, FIG. 4 shows a front view of the filling connection according to FIGS. 1 and 2 with the lid removed, FIG. 5 shows a front view of the representation according to FIG. 1, FIG. 6 shows a rear view of the filling connection according to FIG. 1, FIG. 7 shows a reception opening for the filling connection according to FIG. 1 or 2.

Prior to enlarging in more detail on the details of the preferred embodiment shown in the drawings it is to be noted that each of the features is of inventively essential importance either by itself or in combination with features of the claims.

The filling connection shown in the drawings is generally designated with 10 and comprises two tubular members 11, 12 including between them an obtuse angle. The tubular member 11 comprises an outer portion 13 and an inner portion 14. The outer portion 13 is provided with a radial, conically bent-off flexible flange 15 with an outer conical ring area 16 extending thereat axially to the portion 14, the maximum diameter of said conical ring area 16 adjacent the flange 15 approximately corresponding to the diameter of an opening 17 in a body sheet 18. The body sheet 18 is formed of two layers. In the assembled condition the flange 15 lies in close contact against the outside of the body sheet 18 with the interposition of a flat annular seal 19, which is seated on a short annular section between the flange 15 and the annular area 16. Several arresting noses 20 (see also FIG. 2) distributed over the circumference are coming to lie in close contact against the inside of the body sheet 18, in order to secure the connection 10 in the opening 17. Projections 20 projecting radially above the surface 16 and the annular surface mentioned provide for safety against rotation by being received in recesses 20b of the otherwise circular body opening.

The lower tubular portion 12 is connected to a filling pipe 22 filling the tank, via an elastic sleeve 21. Such a construction is known per se and, therefore, will not be discussed in any more detail.

In the bent-off region between the tubular portions 11 and 12 there is a connection 23 formed at the upper surface the axis of which extends in parallel with the axis of the tubular portion 11. A pipe or hose may be connected to the connection 23 which extends as far as to the highest location of the fuel tank in order to make possible an escape of air during the filling of the tank. An opening 24 between the tubular portion 12 and the pipe connection 13 is screened from the outside by means of an apron-like section 25.

A radial shoulder 26 is formed by a radial enlargement in the tubular portion 11 a short distance behind the location of the bend between the portions 11 and 12, said shoulder serving as a sealing seat for an axially effective sealing still to be described. To improve the sealing effect, the shoulder 26 is provided with an annular elevation 26a.

The inner bore of the tubular member 11, looking from the outside, first is approximately cylindrical as shown at 27 and then tapers conically as shown at 28. The conical bore section 28 is provided with circumferentially spaced axial teeth 29 extending as far as to the shoulder 26. The teeth which are recognizable also in FIG. 4, have a height of 1-2 mm and a triangular cross sectional shape.

A lid 31 is screwed onto an outer thread of the tubular portion 11. The lid is a shaped member having the configuration of a star and deepened in the form of a dish with a center opening 32 (see also FIG. 5). The opening 32 forms the orifice of a stepped cylindrical bore 33 which is defined by a sleeve 34 formed integrally with the inside of the end face of the lid 31. On the opposite side thereof the sleeve 34, the axis of which besides coincides with the axis of the opening 32 is likewise open. The sleeve 34 with the bore 33 serves to accommodate a lock cylinder 35. The opening 32 is disposed adjacent to a concentric deepening 36 of the end face of the lid 31 which is provided with several arresting openings 37. A closure disc 39 provided with arresting feet 40 is fittingly inserted into the recess 36, with the arresting feet 40 passed through the arresting openings 37 in snapping engagement. The closure disc 39 leaves only a small opening 41 for the front section 42 of the closing cylinder 35.

A pot-like element 43 consisting of a cylindrical section 44 and a conical section 45 is arranged axially at the inside of the end face of the lid 31. The cylindrical section 44 is connected to the inside of the lid 31 by means of arresting projections 46, said arresting projections 46 axially projecting from the inside of the lid. The pot-like projection 43, the axis of which coincides with the axis of the cylindrical sleeve 34 is provided at the end face thereof with a seating surface 47 for a sealing arrangement consisting of a slip ring and a flat seal. The flat seal gets into sealing engagement respectively with the shoulder 26 and the bead 26a. The sealing arrangemet 48 is seated in an annular groove 49 of a circular projection 50 at the end face of the pot-shaped portion 43.

Inside the pot-shaped portion 43 there are arranged two diametrically disposed bar elements 51 and 52, the construction of which will still be dealt with in more detail in connection with FIG. 3. In the outer end regions the bar elements 51 and 52 extend through radial openings in the conical portion 45 of the pot-shaped projection 43. In the position as shown in FIG. 2 they are in engagement with the toothing 29 and prevent rotation of the lid 31.

On the inside the bars are guided along the inner surface of the end face of the pot-shaped portion 43 by guiding means still to be described. On the outside they lie in close contact against the end face of the sleeve 34. As may be noted in addition from FIG. 2, the extension of the toothing 29 in an axial direction is almost thrice the width of the bar elements 51 and 52.

FIG. 3 shows a sectional view of the pot-shaped portion 43 in the region of the portion 45 in front of the bar elements 51 and 52. As will be seen from FIG. 3, the pot-shaped portion 43 is provided on diametrically opposed sides with deepenings 53 of an almost rectangular cross sectional shape with the radius of the bottom of the deepening approximately corresponding to the radius of the outer surface of the conical portion 45. One will furthermore recognize that the inner surface of the end face is provided with first pairs of ribs 54, 55 diametrically opposed on both sides of the radial opening in the portion 45, the ribs thereof extending in parallel spaced arrangement and forming a guide for the radial outer portions 56 and 57, respectively, of the bar elements 51, 52. The portion of the bar elements 51, 52 which projects from the radial opening is pointed in the form of a roof. The peaks 58, 59 correspond in profile to about the gap between adjacent teeth of the toothing 29.

Second pairs of ribs 60 and 61, respectively provided on the outside of the ribs 54, 55 spaced through a distance and extending in parallel with them form a guide for the sections 62, 63 and 64, 65, respectively, of the interlocking elements 51, 52. The outer surfaces of the sections 62 to 65 are extending in parallel with the axis of movement of the interlocking elements 51, 52 and prevent canting thereof. The sections 62 and 65 are in addition provided with outwardly pointing projections 66 and 67, respectively, cooperating with two spaced deepenings in the ribs 60 and 61, respectively, in order to obtain a releasable interlocking arrangement in the interlocking and unlocking position of the interlocking elements 51, 52. The unlocking position is shown on the left-hand side of the representation according to FIG. 3. The interlocked position is shown on the right-hand side of FIG. 3.

In the sections facing each other the interlocking elements 51, 52 are joggled into each other with cooperating guiding surfaces being formed. Circularly shaped slots 70 and 71, respectively, are formed in sections 68, 69 facing each other, having the journals 72 and 73, respectively, of the lock cylinder 35 engaging therein. A rotation of the journals 72, 73, by about a quarter circle will lead to a displacement of the bar elements 51, 52 between the interlocking and unlocking positions because the center of the slots 70, 71 is correspondingly offset with respect to the center of the turning circle of the journals 72, 73.

As will finally still be recognized from FIG. 3, the sleeve 34 comprises a continuous elongated recess 74 for receiving a radial projection at the outer surface of the lock cylinder 34, in order to secure the latter therein against rotation. A resilient nose (not shown) provided at the outer surface of the lock cylinder 35 is adapted to be brought into engagement with a recess of the sleeve 34, in order to secure it axially.

The releasable arresting engagement of the bar elements 51, 52 in the interlocking position during final assembly serves as a so-called assembly reminder for the closure cylinder which is not always fitted. As the bar elements are always provided independently of whether a closure cylinder is fitted or not, an arresting engagement of the bar elements makes it possible to secure the position thereof when in the unlocked condition.

I claim:

1. In combination a filling connection for vehicles driven by internal combustion engines and a lid, said connection adapted to be fastened in an opening of the car body and includes a section extending beyond the inner surface of the car body adapted to be connected to a line leading to the fuel tank, while a second section disposed on the outer surface is provided with fastening means onto which said lid may be adjustably attached, and an axially effective sealing means is arranged between said lid and said second section, characterized in that the lid (31) comprises a vented hollow axial projection (43) extending into the filling connection (10) and having a bar (51, 52) movably supported therein which is capable of being adjusted between a retracted and an extended position transversely of the axis of the projection (43) by means of a closure device (35) arranged inside the projection, and a plurality of axially extending circumferentially spaced tooth means (29) arranged on the inner surface of the filling connection (10) and having a substantial axial extent but spaced from the opening thereof with which the bar (51, 52) cooperates when in the extended position, whereby said lid can be axially adjusted relative to said second section through a variety of positions and locked in each such position.

2. Filling connection according to claim 1, characterized in that the end of the bar (51, 52) is shaped according to the shape of the gap between adjacent teeth.

3. Filling connection according to claim 1, characterized in that two diametrically arranged bar elements (51, 52) are guided for radial movement within the projection (43) by means of a radial opening in the projection.

4. Filling projection according to claim 3, characterized in that the bar elements (51, 52) are provided with an arcuate slot disposed in a radial plane for the journal of the closure device capable of movement on a circular path.

5. Filling connection according to claim 4, characterized in that the wall of the projection (43) pointing into the interior of the connection is provided with ribs (54, 55, 60, 61) on the inside for guiding the bar elements (51,52).

6. Filling connection according to claim 3, characterized in that the ends of the bar elements (51, 52) facing each other are joggled with each other said joggled sections mutually guiding each other in the direction of movement of the bar elements (51, 52).

7. Filling connection according to claim 1, characterized in that the axially effective sealing means (48) is arranged on the side of the projection (43) facing the interior of the connection and cooperates with a radial seating surface (26, 27).

8. Filling connection according to claim 1, characterized in that there is a cylindrical axial sleeve (34) arranged inside the projection for the reception of a closing cylinder (35) and the closing cylinder (35) comprises an elastic arresting projection which gets into snapping engagement in a recess of the sleeve (34).

9. Filling connection according to claim 1, characterized in that the lid (31) is provided with a central opening (32) towards the outside through which the closure device (35) is accessible, and the opening is surrounded by a recess (36) into which a cap (39) may be inserted in snapping engagement with the lid (31).

* * * * *